US006416270B1

(12) United States Patent
Steury et al.

(10) Patent No.: US 6,416,270 B1
(45) Date of Patent: Jul. 9, 2002

(54) AUTOMATED LIBRARY KIOSK

(75) Inventors: Rudy Steury, Richfield; Donald E. Thompson, Chaska, both of MN (US)

(73) Assignee: Compu Shop Services, LLC, St. Paul, MN (US)

( * ) Notice: Subject to any disclaimer, the term of this patent is extended or adjusted under 35 U.S.C. 154(b) by 0 days.

(21) Appl. No.: 09/650,439

(22) Filed: Aug. 29, 2000

(51) Int. Cl.[7] .............................................. B65G 65/00

(52) U.S. Cl. ....................... 414/282; 414/268; 414/273; 414/280; 414/281; 700/232; 700/237; 700/242

(58) Field of Search ................................ 414/268, 280, 414/281, 282, 273; 700/231, 237, 232, 242

(56) References Cited

U.S. PATENT DOCUMENTS 3,840,131 A * 10/1974 Castaldi ..................... 214/16.4
4,265,059 A * 5/1981 Johnson ......................... 52/66
4,690,602 A * 9/1987 Castaldi et al. ............. 414/282
4,756,657 A * 7/1988 Kinney ....................... 414/281
4,812,629 A * 3/1989 O'Neil et al. ............... 235/383
5,139,384 A * 8/1992 Tuttobene .................. 414/281
5,499,707 A * 3/1996 Steury ........................ 414/281

* cited by examiner

*Primary Examiner*—Christopher P. Ellis
*Assistant Examiner*—Khoi H. Tran
(74) *Attorney, Agent, or Firm*—D L Tschida

(57) ABSTRACT

A self-service kiosk having a walk-in enclosure, interactive selection panel, multi-section inventory storage area for dispensing items and accepting returns. User selections are entered via instructions entered at an interactive panel containing a selection menu of graphical icons and messages. A programmable controller monitors entered identification data and payments to control the dispensing and return of selected items from assigned storage locations via X-Y-Z track driven, transfer and end effect assemblies. Associated software manages payment transactions via a bill receiver, coin changer, credit card verifier, and receipt printer and develops associated administrative inventory status reports. One end effect includes a hook that interconnects to storage trays. The end effect extends and retracts the trays onto a support platform and conveys the trays and items back and forth from the storage space. A reciprocating comb assembly is also included that cooperates with a magnetic end effect and transfer container.

14 Claims, 11 Drawing Sheets

AUTOMATED LIBRARY KIOSK

BACKGROUND OF THE INVENTION

The present invention relates to automated dispensing equipment and, in particular, to a library kiosk for sundry items that are dispensed and returned to users having personal identification codes.

Varieties of merchandise dispensing assemblies have been developed for many different types of products. Most typically such assemblies operate with uniformly packaged products. Depending upon the packaging, an attendant electro-mechanical support assembly contains the individual packages and sequentially advances the product as requested by a user. Refrigerated and heated products are maintained in enclosures having mechanical support units that dispense the product at a preferred temperature for the product.

Frequently encountered examples of this type of dispensing equipment are dispensers for snack foods such as canned and bottled beverages, candy, chips, popcorn, ice cream bars, etc.. The products are arranged in one or more partitioned racks, trays or spiral clamps in seriatim fashion. The product is dispensed by incrementally advancing the support assembly in response to user-entered selections and deposited moneys.

U.S. Pat. Nos. 4,412,292; 4,766,548; 5,159,560; and 5,207,784 disclose remotely monitored vending dispensers for beverages and videocassettes. Associated control is included for monitoring, recording and/or communicating inventory status to a control center. Inventory administration can be performed on-site or communicated to the central center. Support personnel either on a periodic basis or in response to reported status data access and maintain the inventory.

Information, postage and newspaper kiosks are also known at U.S. Pat. Nos. 5,369,258; 5,271,669; 4,817,043; 4,571,898; and 4,265,059. The former kiosks include interactive capabilities and dispense information from a contained monitor and stamps from a dispenser. The latter newspaper kiosks principally provide enclosures for papers and various novelty items.

A variety of automated teller machines are also known having an interactive control capabilities, and dispensers for distributing money. Interactive greeting card dispensers are also known which custom print cards in response to user entries.

A kiosk capable of dispensing non-uniformly packaged products is also disclosed at U.S. Pat. No. 5,499,707. The stored items are contained in bottomless compartments that are manipulated with a three-axis drive assembly. The kiosk, however, is not operative to accept and store returned items.

The present invention was developed to provide an interactive, self-service, library kiosk that dispenses sundry items and accepts returns. The storage sections and X-Y-Z drive mechanisms of the kiosk are adapted to operate with a variety of end effects (e.g. bottomed and bottomless trays and a slide comb) to dispense and accept returns of stored items. Returned items are restored to their original or other designated storage locations. User selections are made through an interactive audio-visual display panel via personal identification codes. Administrative functions are performed by a local programmable controller and are reported to a remote monitoring station.

SUMMARY OF THE INVENTION

It is a primary object of the invention to provide an automated, self-service kiosk capable of dispensing and accepting returns of a large variety of items of differing size and packaging configurations.

It is a further object of the invention to provide a dispenser having a walk-in enclosure that permits access to stored contents and permits periodic maintenance and servicing.

It is a further object of the invention to provide an interactive, multi-media dispenser that responds and confirms user entered selections and personal identification numbers (pin's).

It is a further object of the invention to provide a dispenser capable of cash or credit card transactions and able to provide receipted transactions.

It is a further object of the invention to provide a dispenser having multiple storage locations and shelving that supports bottomed and bottomless slide drawers that contain inventory and end effects that manipulate the items to and from user access dispensing and/or return ports.

It is a further object of the invention to provide a dispenser having a pegboard storage location that supports comb-type end effects and inventory mounted in recesses between comb teeth along a slide rail.

It is a further object of the invention to provide a controller that cooperates with drive and end effect assemblies that are responsive to computed X, Y and Z axis drive signals developed from coordinates assigned to system storage locations to dispense and/or return items to the storage locations.

The foregoing objects, advantages and distinctions of the invention, among others, are apparent from a preferred construction that provides a walk-in kiosk. Inventory is contained at a beverage dispenser and a modular arrangement of of shelves that are accessible from an interior access space. Each shelf contains a number of drawers or trays that slide on the shelves. The trays can include a bottom or be bottomless. A variety of items of differing sizes and configuration are contained in the drawers.

Some items are mounted to comb-type storage assemblies mounted to pegboard. Items such as bagged or carded materials having punched holes are mounted in recesses between the comb teeth along a slide rail, inserted through the holes. Extension of the comb via a magnetic end effect releases the items from the rail.

The physical dimensions and parameters of each drawer and the X, Y and Z coordinates of each drawer and slide comb storage location is programmed into a digital controller. Metal pull-tabs or plates attached some of the drawers and combs cooperate with a magnetic end effect. Other drawers cooperate with a hooked end effect and transfer platform. A closed loop motorized drive assembly axially directs the end effects in response to X, Y, and Z drive signals. Differing end effects can be attached to the X and Y track/chain drive and/or the vertical columns supported thereto.

User pin's, storage and inventory data is programmed into the digital controller that monitors user receipts, returns and payments. Payments are recorded at an associated bill receiver, change and receipt dispenser and/or pin/credit card verifier. Appropriate Z-axis drive signals are determined in relation to current inventory status. A modem connection validates credit transactions and permits reporting periodic administrative reports to a central station and from which maintenance personnel are dispatched to maintain inventory supplies.

Still other objects advantages and distinctions of the invention will become more apparent upon reference to the following description with respect to the appended drawings. To the extent various modifications and improvements have been considered they are described as appropriate. The description should not be literally construed in limitation of the scope of the invention. Rather, the invention should be construed from the spirit and scope of the appended claims.

Identical reference callouts at the drawings identify related structure and should be so construed.

DESCRIPTION OF THE PREFERRED EMBODIMENT

Figure 1:
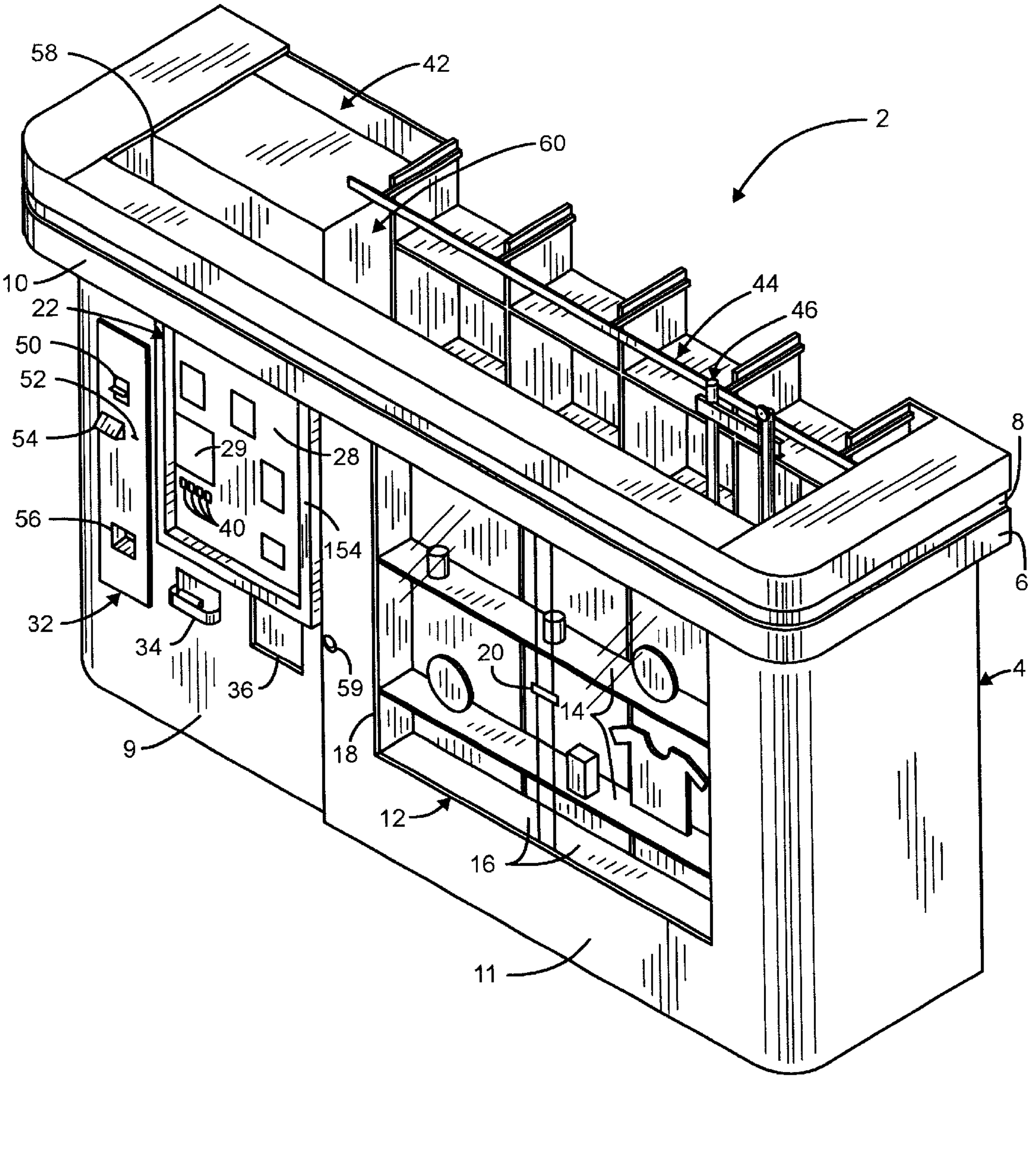
FIG. 1 shows a perspective view of the merchandising kiosk with the top panel removed.

With attention to FIG. 1, a perspective view is shown of a kiosk 2 of the invention. The general construction of the kiosk 2 is similar to that described at U.S. Pat. No. 5,499,707. The kiosk 2 provides a vending center for any variety of items that can be sold or loaned, for example, retail merchandise, tools, and library and instruction materials. With the exception of periodic maintenance and re-supply of inventory, the kiosk 2 is fully automated and does not require any on-site staff.

The kiosk 2 can be readily fitted to available wall space or central floor space at any user site without undue cost. With the exception of necessary power and telephone connections, the kiosk 2 requires no special electrical or plumbing connections. The kiosk 2 occupies a floor space of approximately 4 feet×10 to 15 feet, depending upon the volume of inventory. As more or less inventory is required, the physical size of the enclosure 4 can be adjusted. As configured at FIG. 1, an open back of the enclosure 4 is mounted against an available wall.

The kiosk 2 is normally positioned at locations known to the users and who are assigned personal identification numbers (pin’s). In a typical setting, the kiosk 2 might be located in a corridor or lobby of a building or a work area of a business. A relatively high visibility location is preferred, which is in the normal travel path of the targeted user, and which is convenient to support staff to assure optimal customer satisfaction and provide a degree of security.

The enclosure 4 is constructed as a wood framed structure and provides a laminated wood and metal trim exterior. The enclosure 4 includes a canopy 6 that projects beyond the enclosure walls 4. The canopy 6 includes a metal trim strip 8 and supports associated accent lighting (not shown) in a space between an outer flange 10 and the front walls of the enclosure 4.

The enclosure 4 can be constructed to any number of shapes. It can also be constructed using a variety of conventional metal and wood framing techniques to provide any desired degree of relative security for the contained merchandise. A variety of accent arrangements can be provided, depending upon the esthetics of the mounting location and/or user preference.

The enclosure 4 includes a hinged panel 9 and a stationary panel 11. Prominently positioned at the front stationary panel 11 is a display case 12. The display case 12 is recessed approximately 6 to 12 inches and includes a number of conventional glass shelves 14. Safety glass doors 16 cooperate with an extruded metal trim 18 that contains channels that support slide tracks for the doors 16. A lock 20 secures the doors 16.

The display case 12 can be sized as desired and may alternatively project from either the stationary or hinged panels 11 and 9. Presently, the case 12 occupies a space approximately 6 feet wide by 5 feet tall by 6 to 12 inches deep. The size can be varied as desired in relation to the dimensions to the enclosure 2.

The items displayed in the case 12 are typically representative of some of the items contained in the kiosk 2. Detailed listings of the inventory are available at an adjacent interactive panel 22, discussed in more detail below, where a user enters his/her selections. The enclosure 4 at the above dimensions is capable of supporting 300 to 500 different items. Larger or smaller enclosures can be constructed depending upon the merchandise and/or installation location and/or re-supply schedule.

Mounted to one side of the display case 12 is the interactive user data entry panel 22. The panel 22 senses user actions to dispense or to return specific items from and to inventory. A payment panel 32 and two dispensing ports 34 and 36 border the panel 22. Depending upon the internal inventory transfer assemblies and control software, the ports 34 and/or 36 can be used to accept returned items. Any desired combination of dispensing and return ports can be included.

The panel 22 includes a faceplate 28 containing printed graphics, icons 40 and a display screen 29. A computer controller 30 is mounted behind the faceplate 28. The faceplate 28 is printed over with appropriate operating instructions and graphical icons 40 that depict general groupings or categories of the stored contents. The items contained in each group are further defined at the monitor 29. An audio speaker 38, see FIG. 10, can be mounted in close proximity to the panel 22 to broadcast audio instructions to assist the customer and messages to attract customers.

Figure 11:
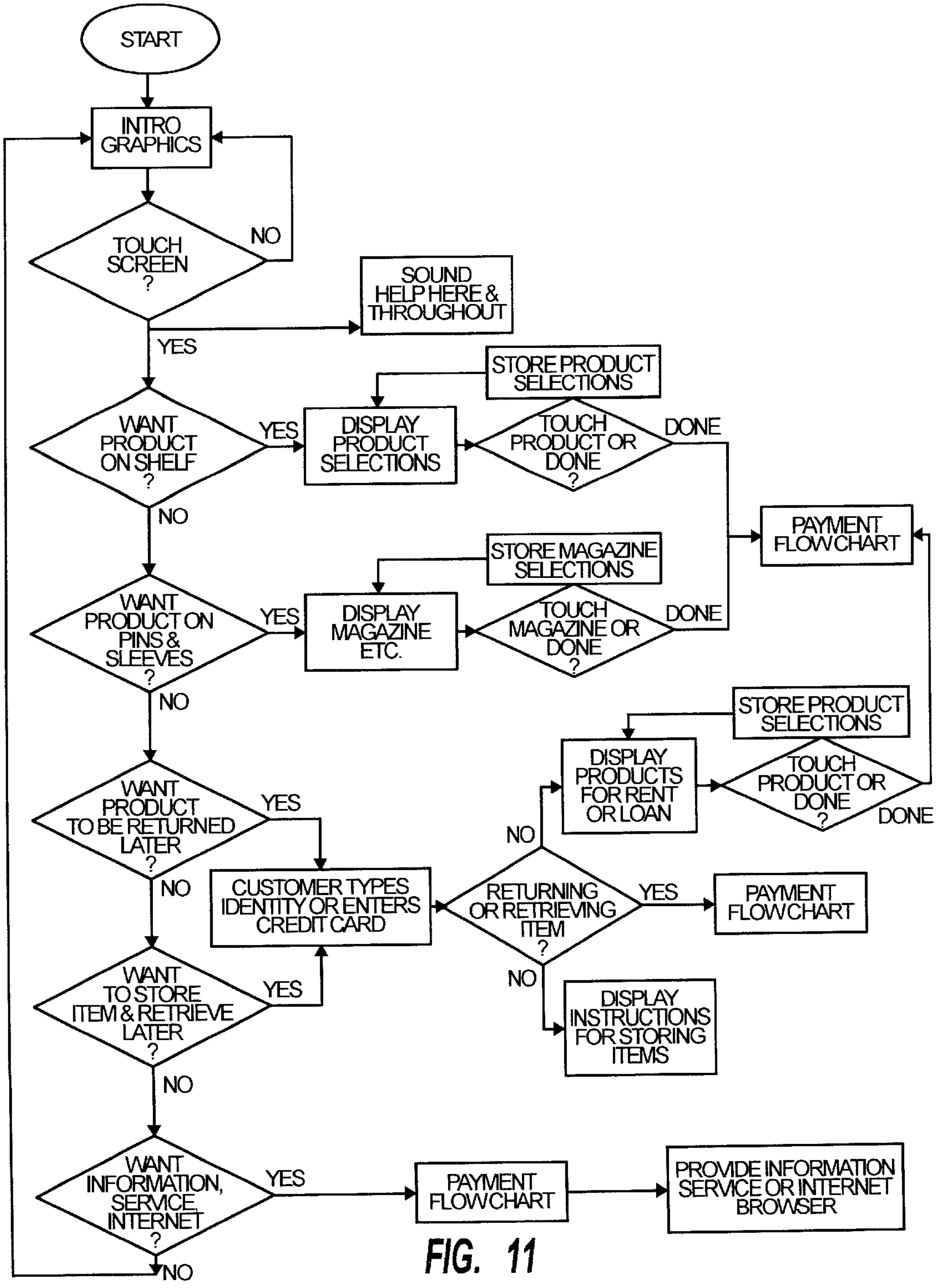
FIG. 11 is a system flow chart to the processor controller software that responds to user entered data and controls the system operation and the X-Y-Z drive signals to the track and end effect drive assemblies.
Figures 12A, 12B:
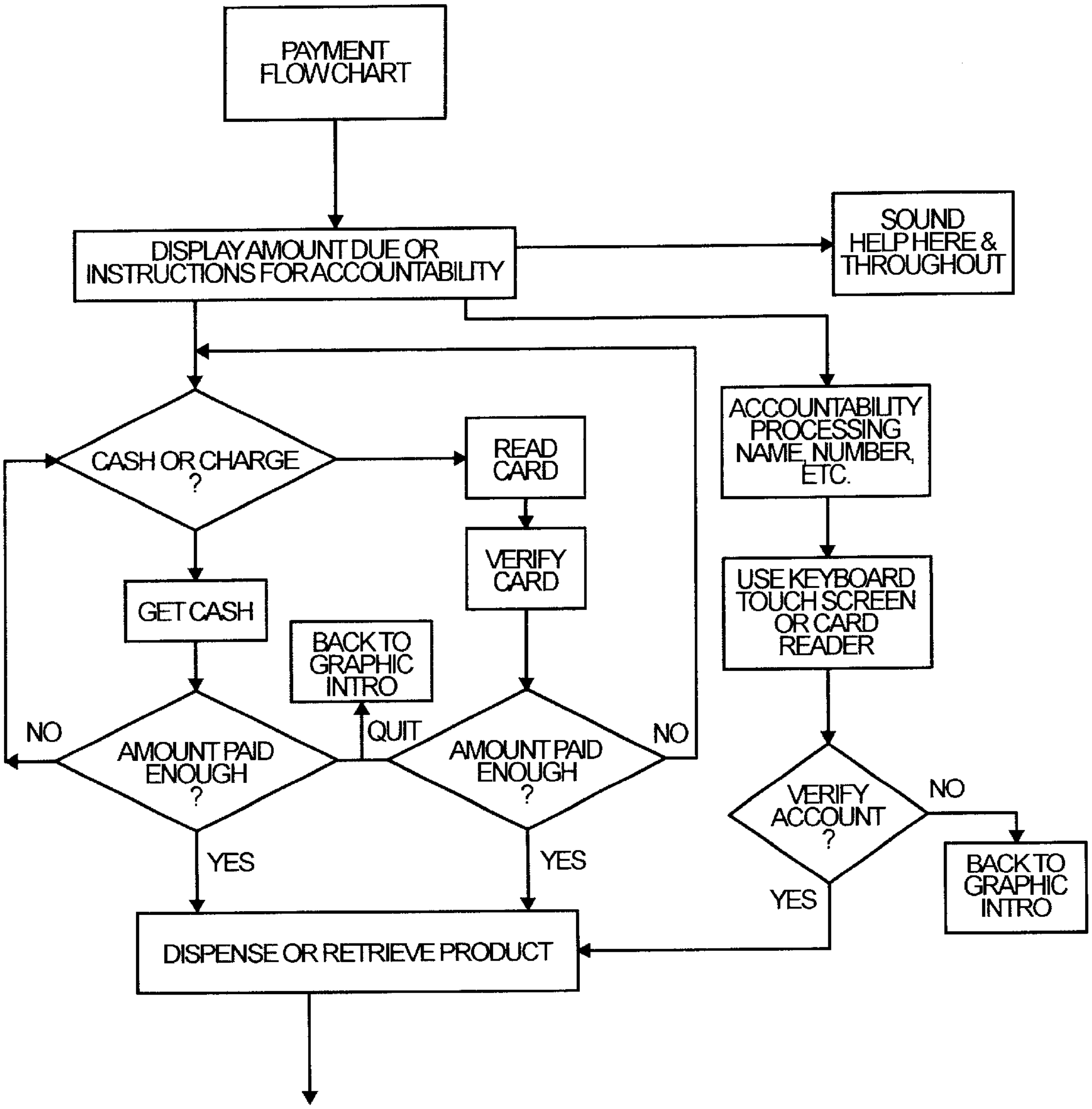
FIG. 12 shows a generalized flow chart to the payment and dispense and retrieve functions.
Figures 12A, 12B:
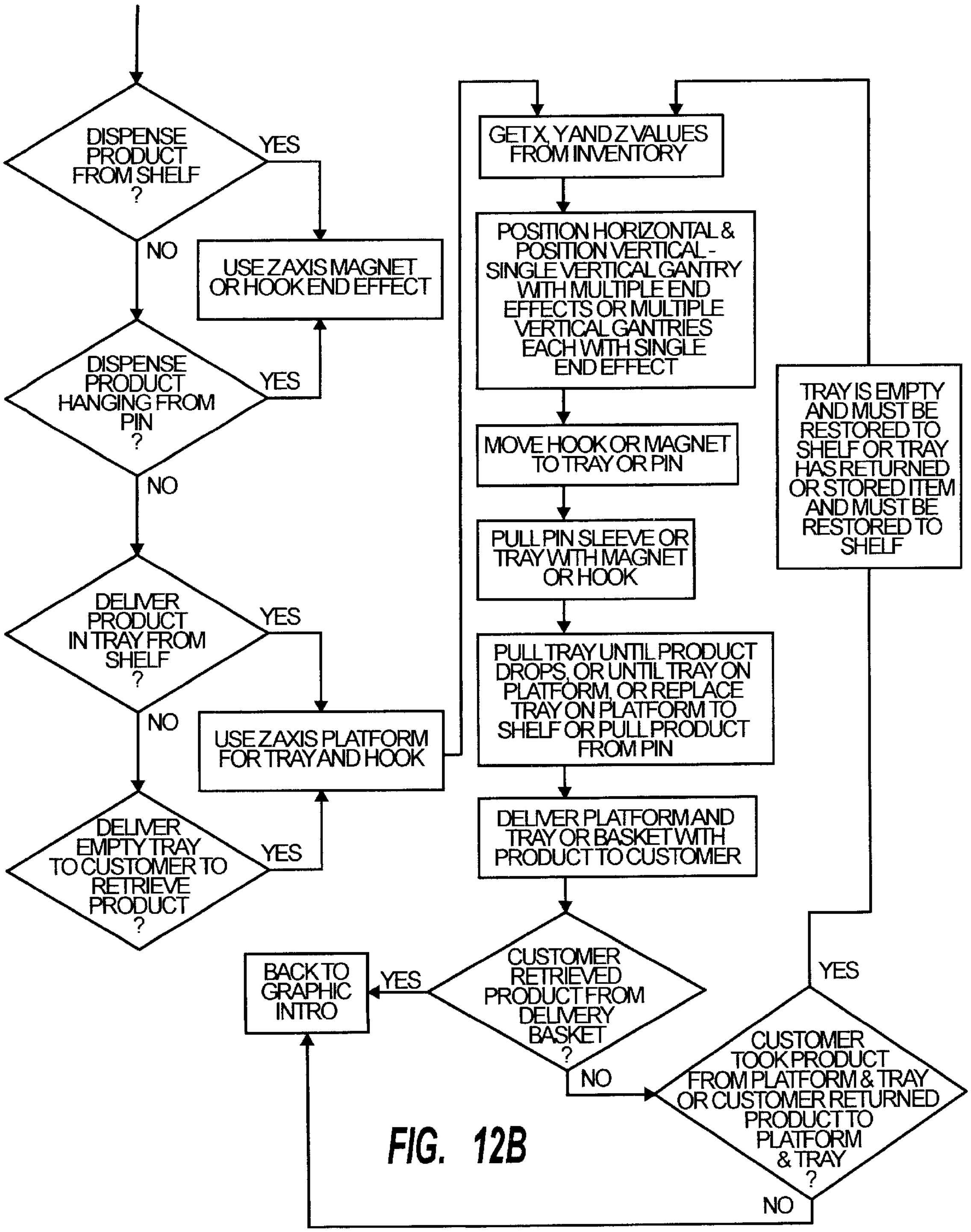

The icons 40 and monitor 29 provide detailed instructions and lists of the stored items. The user follows the menu’ed instructions and selection sequence displayed at the monitor 29 to make appropriate selections. FIGS. 11 and 12 depict flow charts to the interactive selection and payment processes performed by the kiosk 2 with a user. FIG. 12 correlates the selections to alternative end effects that perform the dispensing and retrieval or return functions.

The monitor 29 may alternatively provide specifically programmed, menu’ed instructions and/or listings to the customer for the particular merchandise programmed into the computer, without using icons 40 to pre-select category groups. The icons 40 might then be programmed to select the displayed item. Dedicated, specific purpose switches may also be mounted to the panel 22 and coupled to the computer controller 30 to appropriately operate the internally mounted dispensing equipment. The switches can be used in lieu of the touch screen capabilities at the panel 22 and monitor 29. A monitor 29 having an active touch screen may also be used alone or in association with the touch panel.

Figure 9:
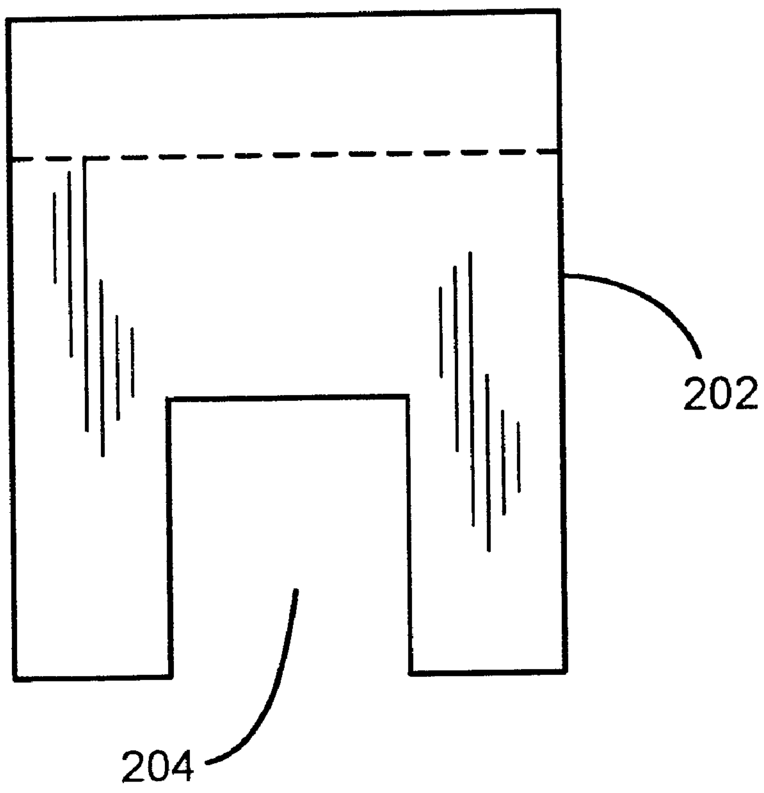
FIG. 9 is an end view to the comb of FIG. 8.
Figure 10:
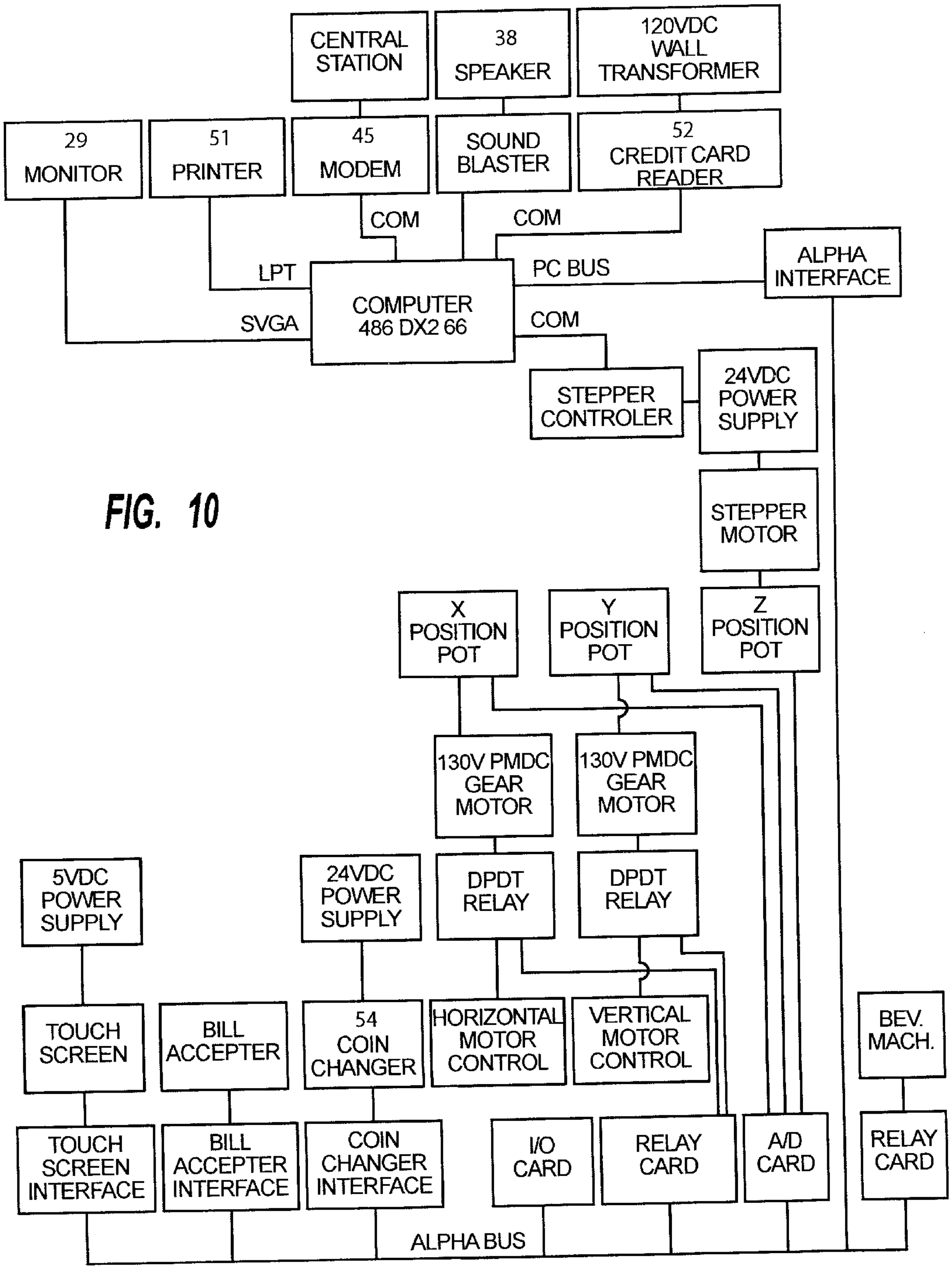
FIG. 10 is a schematic diagram to the system controller.

With the entry and confirmation of a user pin and/or payment for desired items, supporting digital to analog interfaces and electro-mechanical drivers and servos, shown at FIG. 10 and more fully discussed at U.S. Pat. No. 5,499,707 and FIGS. 3–9, appropriately respond to user entered selections. The selected item is appropriately dispensed to ports 34 and 36 or accepted from the available ports for return to inventory.

Figure 2:
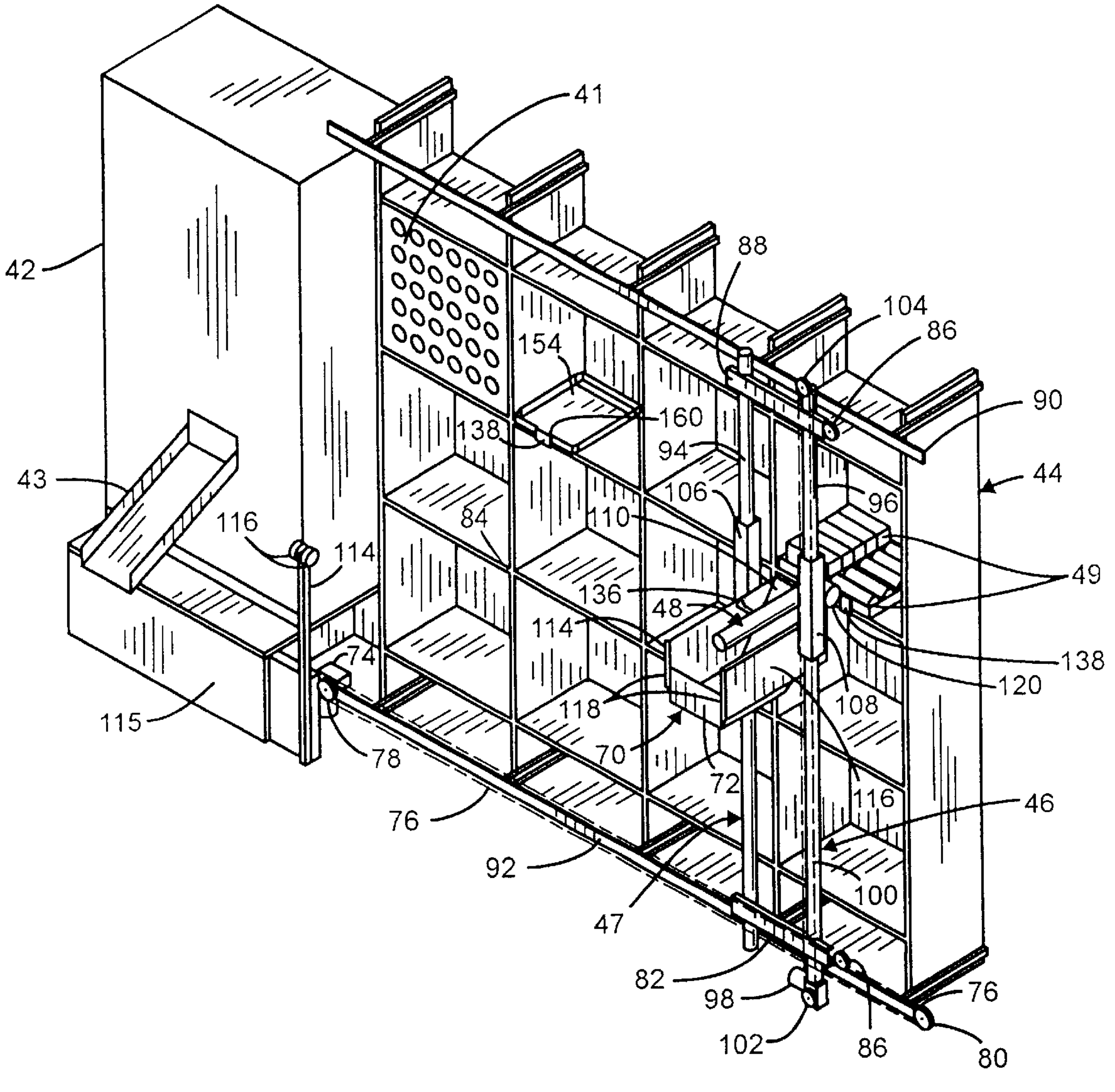
FIG. 2 shows a perspective view of a track mounted end effect drive assembly.

The kiosk 2 typically operates to dispense dry goods, although can be adapted to dispense beverages, such as shown in FIG. 2. In such a configuration, a conventional beverage dispenser 42 is mounted inside the enclosure 4 and is aligned to the port 34 via a chute 43 to dispense a selected beverage. The beverage dispenser 42 can be deleted from the kiosk 2 when not practical to the user application.

Other items stored in the kiosk 2 are dispensed at the port 36. Returns are also made to the port 36. Stored inventory is contained within the enclosure 4 at modular inventory storage areas that in the kiosk 2 is principally a shelving assembly 44. A space defined by pegboard 41 is also provided that cooperates with the comb-type retainers discussed below with respect to FIGS. 8 and 9.

The storage space can be organized in any desired configuration relative to the dispensing/return ports. For example, additional rows of shelving 44 or walls of pegboard 41 can be mounted behind the shelving 44 or extend from the left end of the dispenser 42. Regardless of the selected geometry, the associated transfer assembly 46 must be able to operate to deliver and retrieve selected items to and from the ports.

A driven, 3-axis transfer assembly 46 is mounted to the shelving 44. The controller 30 operates in response to authorized user selections to manipulate one or more tower assemblies 47 that are attached to the transfer assembly 46 and the end effects supported to each tower 47. Each end effect assembly is adapted to dispense and/or retrieve items from an assigned storage space that is adapted to each stored item.

A magnetic end effect 48 and transfer bin 70 are particularly shown at FIG. 2. The end effect 48 provides a magnetic coupling with bottomless trays or drawers 49 supported at the shelving assembly 44. The transfer bin 70 receives and dispenses the items to the outlet port 36. FIGS. 3–9 provide alternative or additional end effect assemblies that can be mounted to any available towers 47 to convey items between the storage locations and the outlet port 36.

The controller 30 maintains a running record of user interactions with the kiosk 2 and available inventory contained in the kiosk 2 to appropriately direct the tower 47 and supported end effect assemblies. Sales reports, payment verification, maintenance and re-supply information are transmitted from the controller 30 over a modem 45 and available phone lines to a central station, see FIG. 10.

Coordinated with the controller 30 is the payment panel 32. The panel 32 includes a bill reader 50, credit card verifier 52 that is coupled to the modem 45, receipt printer 51, coin changer 54, and a coin and receipt-dispensing tray 56, see also FIG. 10. The receipt printer 51, reference FIG. 10, is mounted to dispense a printed receipt of each user transaction at the tray 56 in addition to any coins directed from the bill reader 50 and coin changer 54. Where the kiosk performs internal library functions, the receipt would typically show information regarding the loan, pending due dates and/or data confirming the aborting of the transaction due to delinquent transactions.

The panel 9, which contains the primary user interface panels 22 and 32, is hinged to the enclosure 4. Upon disengaging a lock, the panel 9 can be rotated open to expose the beverage dispenser 42, monitor 29, computer controller 30, bill reader 50, credit card verifier 52, receipt printer 51, and coin changer 54.

Also exposed with the pivoting of the panel 9 is an access space or walkway 60 between the shelving 44 and back of the display case 12. The access space 60 extends the length of the shelving 44 and permits service and maintenance personnel access to the transfer assembly 46, end effect 48, transfer bin 70, shelving 44 and pegboard 41 to maintain the inventory and proper operation of the kiosk 2. All of the various electro-mechanical support assemblies, along with the storage locations can thus be accessed, maintained and serviced.

With attention to FIG. 2 particular details are shown to the construction of the shelving 44 and the mounting of the transfer assembly 46, magnetic end effect assembly 48 and transfer bin 70 thereto. The transfer assembly 46 generally provides a track supported conveyer mechanism for the tower assembly 47, end effect 48 and collection bin 70.

As earlier noted, multiple transfer assemblies 46 can be layered one in front of the other or can extend from opposite sides of the outlet port 36. One or more tower assemblies 47 can be attached to each assembly 46 and/or can support multiple end effects that can be the same or different.

Appropriate horizontal and vertical (i.e. "X" and "Y") Cartesian drive signals are provided from the controller 30 to a horizontal drive motor 74. A chain or belt 76 is trained about a drive sprocket 78 and idler sprocket 80 and to a base frame 82 at the selector 46. Movement of the tower 47 is indexed to a pre-established index mark 84 that corresponds to a known reference at the shelving 44. Movements of the tower assembly 47 are determined and directed by the controller 30 in relation to the index mark 84. Guide wheels 86 are supported to the base frame 82 and a top frame 88 of the selector 46. The wheels 86 mount within and follow a grooved track at upper and lower horizontal tracks 90, 92. The frames 82 and 88 are shown pulled away from the tracks to expose the guide wheels 86.

The end effect 48 and transfer bin 70 are directed independently along the tower assembly 47 at a pair of tubular metal columns 94 and 96 that extend between the base and top frames 82 and 88. A vertical drive motor 98 mounted to the base frame 82 drives a second chain 100 that is trained about drive and idler sprockets 102 and 104 aligned to the column 96. A portion of the chain 100 extends within the column 96 and is secured to the end effect 48 and transfer bin 70. Vertical drive signals to the motor 98 raise and lower the end effect 48 and bin 70. Gear motors 74 and 98 are presently used to control the X and Y movements of the transfer assembly 46. Such motors provide satisfactory positional control to a tolerance on the order of ¼ inch in the X-Y plane and 1/64 inch in the Z plane.

Slide collars 106 and 108 contain the end effect 48 and bin 70 to the columns 94 and 96. The collars 106 and 108 mount over the vertical columns 94, 96 and include internal bearing surfaces that freely slide along the columns 94 and 96 without hampering movement of either the end effect 48 or collection bin assemblies 70. The end effect 48 is secured to the collar 108 and the collection bin 70 is secured to both of the collars 106 and 108. The collar 108, in turn, is secured to the ends of the chain 100 such that the drive motor 98 vertically directs the end effect 48 and bin 70.

The vertical "Y" drive signals are supplied from the controller 30 to the motor 98, independent of the horizontal "X" drive signals to the motor 74, to raise and lower the end effect 48 to an appropriate shelf space and drawer 49 containing an item selected by the user. The controller 30 is continuously programmed with the location and inventory condition of the kiosk 2. The corresponding X, Y and Z drive signals are determined in relation to the inventory data. The horizontal and vertical drive signals are simultaneously supplied to the respective drive motors 74 and 98 to reduce dispensing time. Alternatively, the X and Y drive signals may be sequentially applied. Analog feedback signals are coupled from the transfer assembly 46 to the controller 30 via potentiometers that are described in more detail below. The drive and feedback signals are presently correlated as voltage dependant signals that are related to the index 84.

Secondary position confirmation data can be obtained from transducers mounted about the shelving 44 to detect the relative movements of the transfer assembly 46, end effect 48 and bin 70. For example, limit switches may be secured to detect relative movement of the transfer assembly 46 and collection bin 70 to the shelving 44. Photo-optic sensors or a variety of other known motion sensors can be positioned to detect and confirm proper movement of the assemblies 46, 48 and 70 in relation to the inventory. The inherent accuracy of the stepper motors and closed loop feedback obtained with included potentiometers provides adequate drive tolerances for the present kiosks 2.

The transfer bin 70 is constructed as an open topped container 72 and includes a wall 110 that is shaped to align to the shelving 44 and sloped to direct selected merchandise to the bottom. A partial front wall 112 assures the selected item does not prematurely fall from the container 72 during transfer to the port 36. The length of the container 72 is sized to permit substantial extraction of each drawer 49 from the shelving 44. As a drawer 49 is extended, each interior compartment is exposed to the container 70 and the merchandise falls from the drawer 62 into the container 72.

The transfer bin 70 secured to the collars 106 and 108 via a pair of side supports 114 and 116 and a pair of extensible slide tracks 118. The slide tracks 118 extend and retract along the supports 114 and 116 to permit a horizontal extension of the container 72 into abutment with the shelving 44.

Once the transfer container 72 is filled with any authorized user selections, appropriate amount of selections, necessary X, Y drive signals convey and align the container 72 to the port 36. The user can then extract the items. The controller 30 computes the drive signals in relation to current location and inventory data stored in temporary buffers, registers or memories at the controller 30. The controller 30 selectively manipulates the transfer and end effect assemblies 46 and 48 to each appropriate storage location before sending the container 72 to the port 36. Individual selections might also be made one at a time. Alternatively, the user can deposit items in the empty container 72 and the container 72 can be directed to a desired location to effect return. A UPC card reader can be included with the kiosk to confirm the return of previously loaned items.

With the sending of the container 72 to an X, Y location immediately behind the port 36, the container 72 is lowered onto a roller arm 114 that vertically projects from a base support 115 at the dispenser 42. As the sloped wall 110 engages a pair of rollers 116, the container 72 is directed toward the port 36. The slide tracks 118 also facilitate container movement. A return spring (not shown) mounted between the container 72 and side supports 114 and 116 biases container movement to assure the return of the container 72 to a fully retracted position prior to the next selection sequence.

The lateral displacement of the container 72 is required with the kiosk 2 to accommodate the recessed display case 12. For enclosures that do not provide a recessed display case 12, lateral bin movement may not be required.

Also mounted to the slide collar 108 is the end effect assembly 48 and which is described in detail at U.S. Pat. No. 5,499,707. An electromagnet 136 is secured to the assembly 48 and cooperates with steel plates 138 secured to the front of each drawer 49. With the engagement of the magnet 136 to a metal plate 138, the drawer 49 can be extended and retracted an appropriate distance. The necessary "Z" axis drive signals to the motor 120 are determined in relation to pre-programmed data specific to the drawer dimensions and configuration and current inventory status.

The steel plates 138 are secured to the front wall of each drawer 49 to partially depend below the drawer bottom and engage an edge of the shelving 44. Each plate 138 therefore also serves as a stop limit to drawer movement as each drawer 49 is re-inserted onto the shelving 44.

The motor 120 is also operated to take advantage of an inherent tolerance to slippage. That is, the controller 30 slightly over extends the arm 132 as each drawer 62 is engaged and returned to assure good contact between the magnet 136 and plate 138 and between the plate 138 and shelving 44. Alternatively, an adjustable, resilient linkage might be fitted to the end effect assembly 48 to permit minor adjustments to accommodate movement tolerances and assure a close alignment between the magnet 136 and plate 138 prior to operation of the magnet 136 at the start of each drawer extraction.

A separate drawer withdrawal limit is not presently required, due to the inherent accuracy of the transfer assembly 46 and end effect 48. Each drawer 49 is presently withdrawn to within ¼ to ⅜ inch of the shelf edge. Depending upon travel tolerances, appropriate controls can be included to prevent over withdrawal of a drawer 49.

Figure 3:
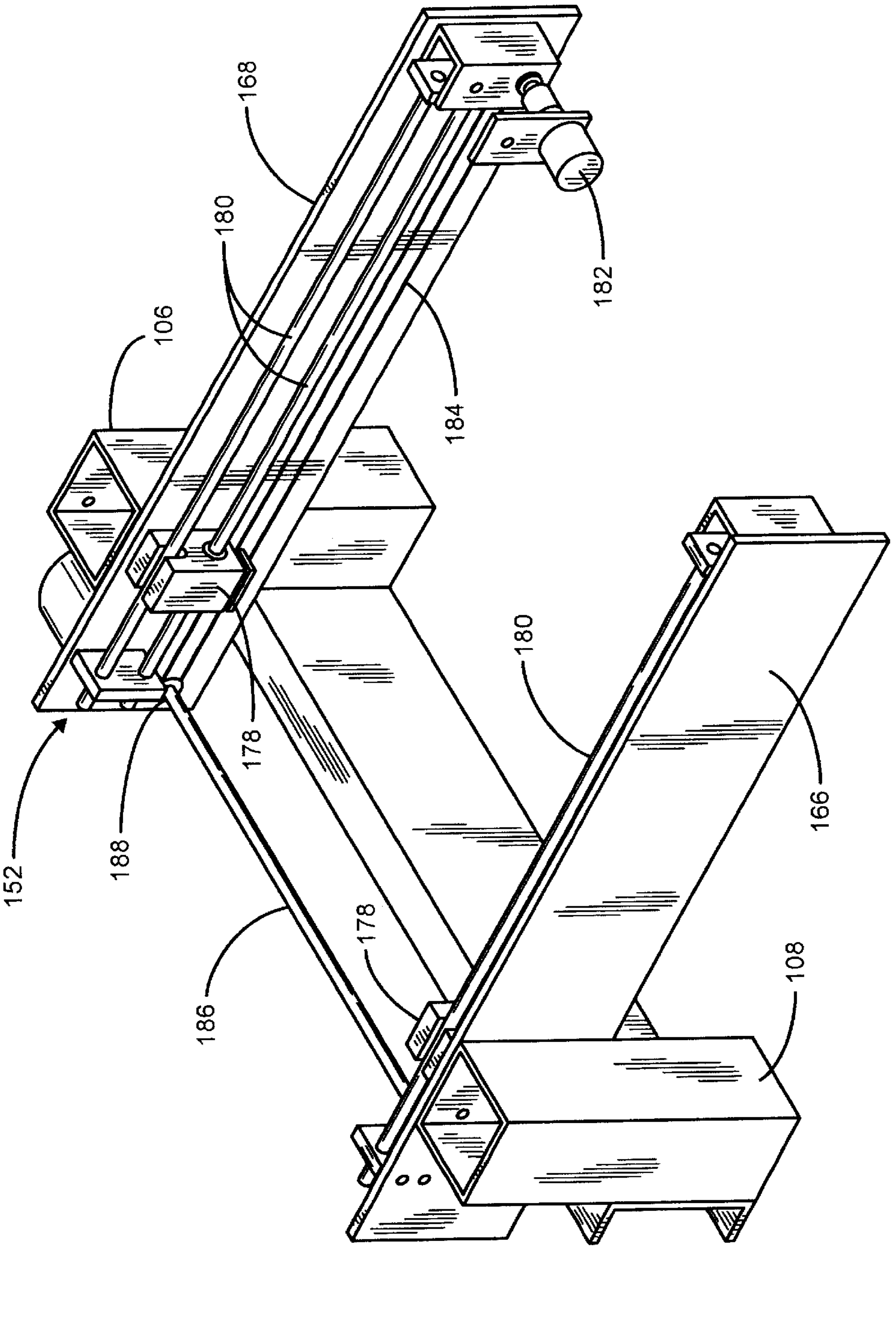
FIG. 3 shows a perspective view of a vertical and horizontal end effect drive assembly.
Figure 4:
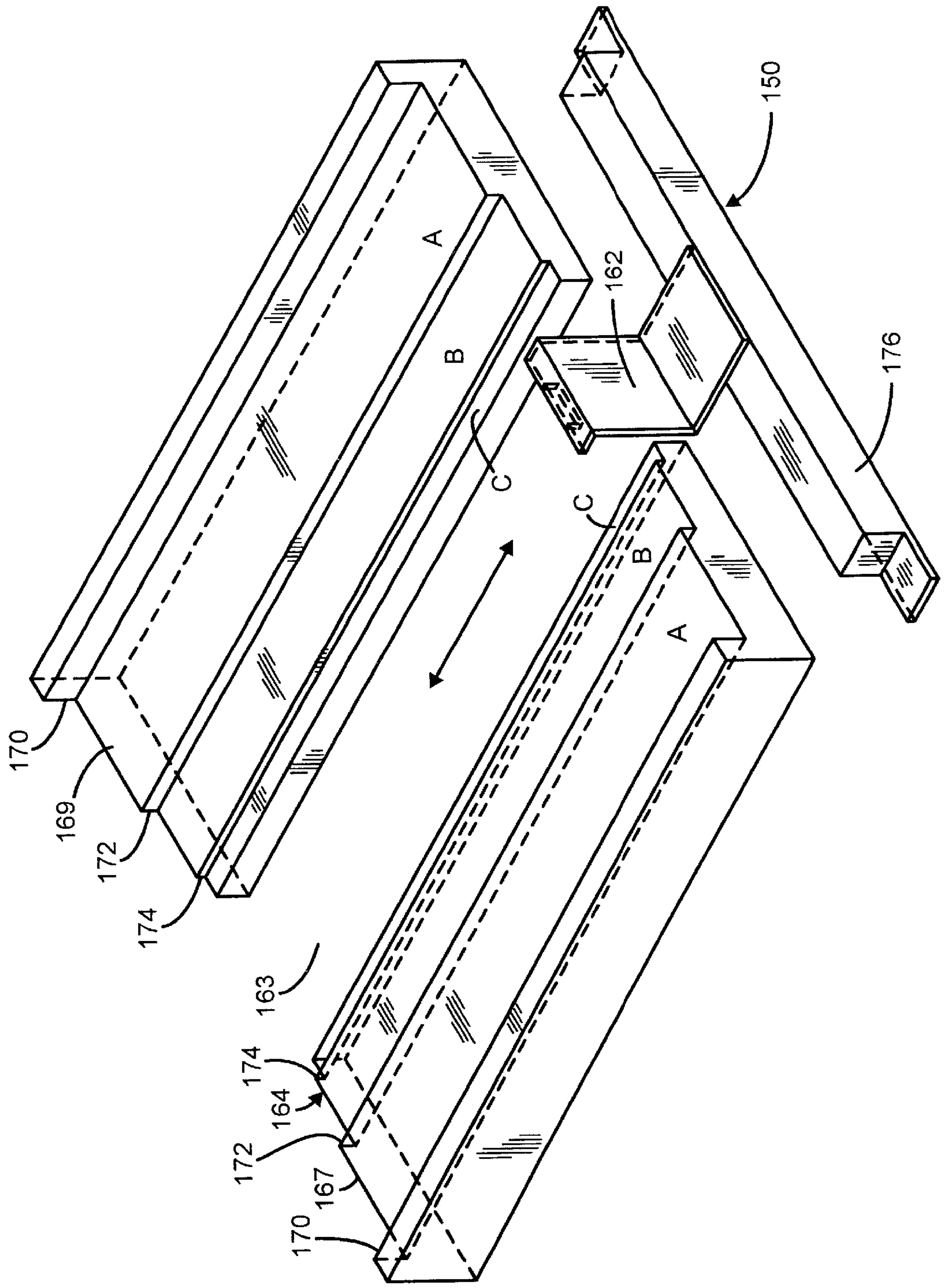
FIG. 4 shows an exploded assembly view in perspective to a multi-level tray support platform and tray hook for a closed or open bottom tray end effect assembly.
Figure 5:
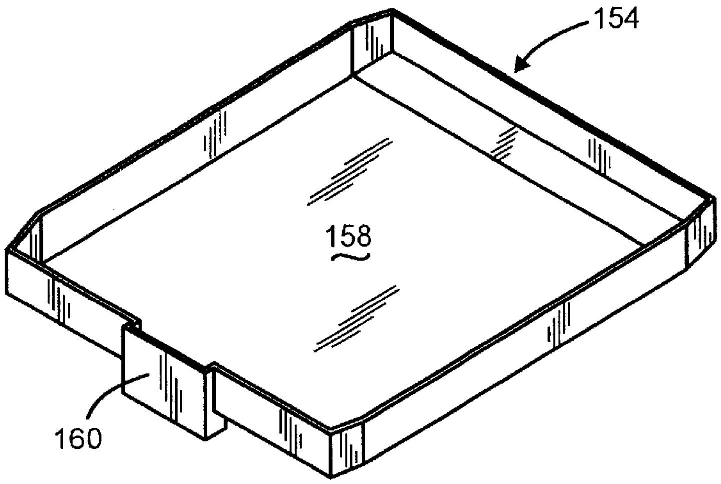
FIG. 5 shows a perspective drawing to a tray that slides on the “A” level of the platform of FIG. 4.
Figure 6:
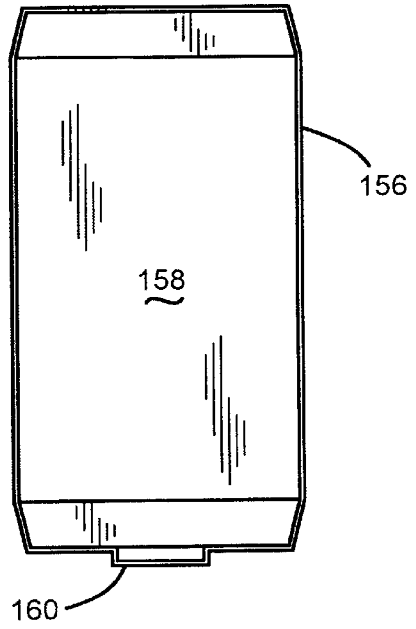
FIG. 6 shows a perspective drawing to a tray that slides on the “C” level of the platform of FIG. 4.
Figure 7:
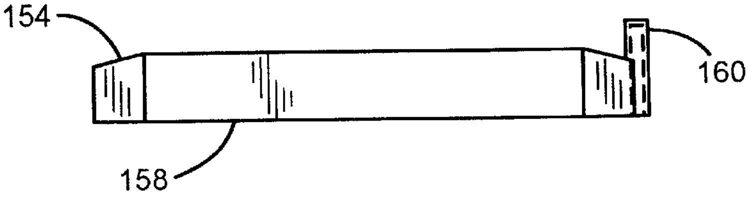
FIG. 7 shows a side view to the trays of FIGS. 5 and 6.

An alternative, hook-type end effect 150 and tray conveyor assembly 152 is shown at FIGS. 3 and 4. The end effect 150 can be used in lieu of the magnetic end effect 48. The end effect 150 can be attached alone or in combination with the end effect 48 or any other end effect to any tower assembly 47. The end effect 150 cooperates with a number of trays of differing sizes that have bottoms 158. Two specific trays 154 and 156 are shown at FIGS. 5–7. The width, length and height of each tray 154 and 156 can be designed as desired relative to the space provided at the shelving 44 and each stored item. A projecting lip 160 is provided at each tray 154 and 156. The lip 160 interconnects with a flanged hook 162 that projects from the end effect 150 and that is lowered over the lip 160 to catch the tray. The shape of the lip 160 and hook 162 can be varied as desired, provided a desired coupling can be made to manipulate the trays 154 and 156 to and fro from the shelve assembly 44.

The hook 162 extends and retracts along a channel 163 at a platform 164 that is secured to side panels 166 and 168 at the conveyor assembly 152. The platform 164 is constructed from two laterally displaced sections 167 and 169 that are separated by the channel 163. Three slide surfaces A, B and C at different levels are defined by the platform sections 167 and 169 between tapered upright sidewalls 170, 172 and 174. The tapered surfaces of the sidewalls 170, 172 and 174 laterally center each selected tray 154 or 156 as the tray is drawn onto the platform 164 via the hook 162. As a tray 154 or 156 is extracted from the shelving 44, the controller 30 directs the platform 164 and supported tray to the port 36. A user then removes the selected item from the tray. The platform 164 and empty tray is then returned to the storage location, where the tray is pushed via the hook 162 back into position on the shelving 44.

During a return sequence, the empty tray is re-conveyed to the port 36, where the user deposits the item. The platform 164 is then re-directed to the storage location and the tray and returned item are pushed via the hook 162 back onto the shelving 44.

The conveyor assembly 152 determines movement of each tray onto and from the shelving 44 and platform 164. The movements are effected via a cross member 176 that supports the hook 162 and that is secured to slide blocks 178 of the conveyor assembly 152. The slide blocks 178 are directed toward and away from the shelving 44 via guide rails 180, a motor 182, drive wire 184 or equivalent, idler axle 186 and pulleys 188 attached to the side panels 166 and 168.

FIG. 2 also shows the tray 154 fitted with a plate 138. Although not depicted, it is to be appreciated a magnetic end effect 38 and magnet 136 can be secured to the tower 47 and in lieu of a hook 162 to interact with the tray 154 in the same fashion as the bottomless trays 49. In this instance, the magnet would manipulate a tray 154 onto and off of the platform 164 and conveyor assembly 152.

Figure 8:
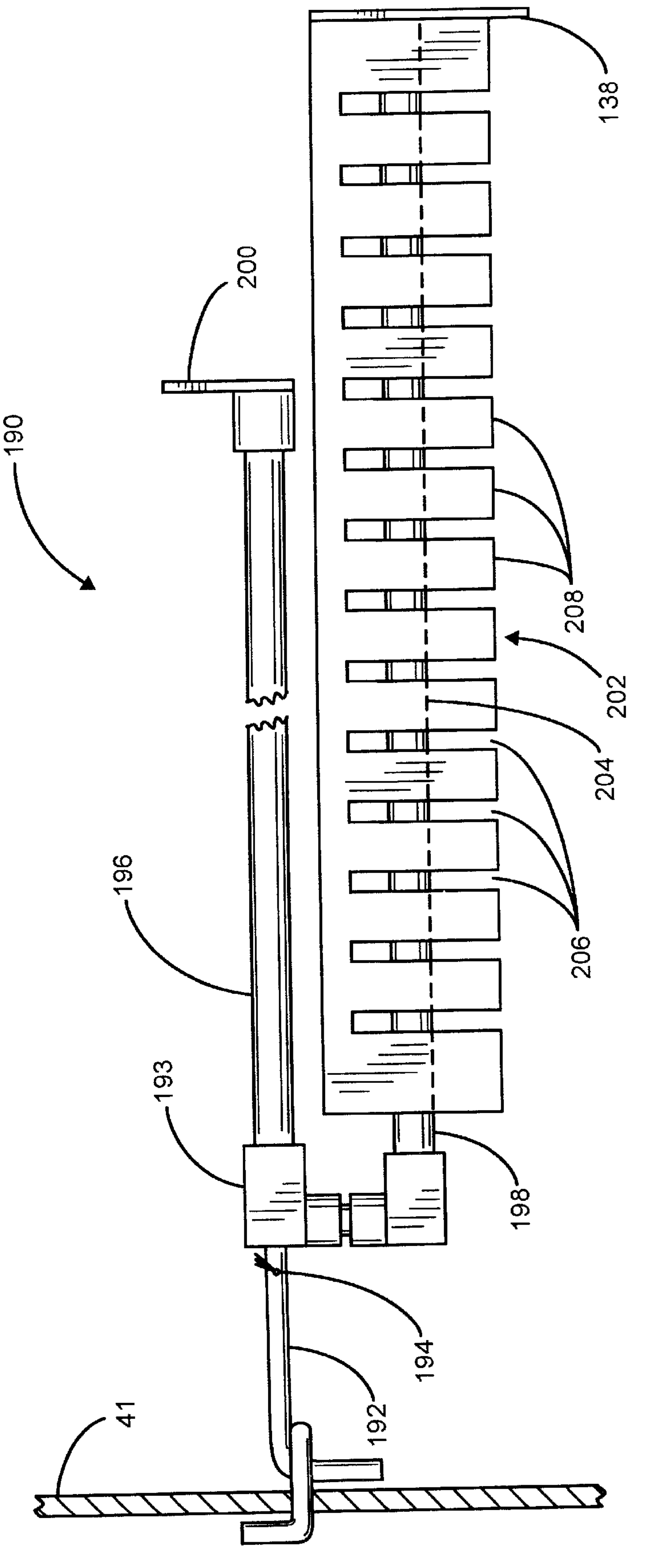
FIG. 8 shows a pegboard mounted comb type end effect assembly.

In lieu of bottomless and bottom walled drawer storage containers, FIGS. 8 and 9 depict a comb-type storage assembly 190 that cooperates with the magnetic end effect 48. The comb assembly 190 finds particular application with the pegboard 41 and items mounted thereto. A number of assemblies 190 are typically mounted to the pegboard 41 with conventional rod hangers 192. A roll pin 194 projects from the hanger a92.

Each assembly 190 includes a pair of displaced horizontal rails 196 and 198. Presently, the rails 196 and 198 are hollow. The length of the rails 196 and 198 can be sized as desired, although the rail is shown broken. The projecting hanger 192 mounts in the bore of the rail 196 and slips over the roll pin 194 at a provided slot (not shown) in the end piece 193. The pin 194 acts as a stop to movement of the rail 196 on the hanger 192. A metal plate 200 is attached to the end of the rail 196.

A comb member 202 is constructed in a U-shape; see FIG. 9, from a formed nylon material. A longitudinal channel 204 extends the length of the comb 202. The length of the comb 202 can be formed as desired. A plate 138 is secured to the end of the comb 202 and the comb 202 is supported for reciprocating motion along the rail 198 in the channel 204. The spacing of the comb 202 from the rail 196 is also such that the comb 202 is restricted from pivoting on the rail 198. Bagged or carded items are typically mounted in the spaces 206 between the teeth 208 of the comb 202. The rail 198 is inserted through punched support holes in item packaging.

The metal end plates 200 and 138 generally cooperate with the magnetic end effect assembly 48 as previously described. First however, the magnet 136 interacts with the plate 200 to draw the assembly 190 away from the pegboard 91 a distance determined by the pin 194. The magnet 136 is then released and lowered to grip the plate 138 and draw the comb 202 forward sufficiently. Items attached to the rail 198 are released from the rail 198 as the rail 198 is drawn into each tooth 208 and the adjacent space 206 is exposed so that the supported item falls into the container 72.

The foregoing comb assembly 190 can also be adapted to accept returned items. For example, an insert to the container that holds a packaged item in an upright condition and at a height sufficient to align with the rail 198 can be mounted in the container 72. The user is instructed to appropriately mount the item to the insert. Presuming the packing is flexible, upon returning the dispensed item to a position adjacent the appropriate assembly 190 and manipulating the comb 202 forward, the packaging can be made to flex into a desired space 206 before pushing the comb 202 and packaging back along the rail 198.

The various alternative operating sequences of the kiosk 2 are shown at the flow charts of FIGS. 11 and 12. System operation is dependent upon receipt of payment or entry of an assigned pin code. Where items are dispensed on loan, limits can be included to require return of earlier items before additional items are dispensed.

With the selection and payment processes completed, the controller 30 produces the necessary X, Y, Z, drive signals to manipulate the transfer assembly 46 and associated end effect assemblies 48 and 150 relative to the drawers 49, trays 54 and 56 and/or comb assembly 190 to dispense or return the selected items from and to assigned storage locations.

While the invention has been described with respect to a presently preferred construction and various considered modifications and improvements thereto, still other constructions may also be suggested to those skilled in the art. For example and although several alternative storage devices and cooperating end effects have been described, still others can be constructed that can be accommodated at the drive assembly 46. The invention should therefore not be narrowly construed to the foregoing description. Rather, the invention should be interpreted broadly within the spirit and scope of the appended claims.

What is claimed is:

1. A self-service kiosk comprising:

(a) a portable multi-walled enclosure surrounding a plurality of shelves and including a port communicating with the exterior of said enclosure, wherein said shelves support a plurality of drawers, and wherein at least one of said plurality of drawers includes a bottom that circumscribes an inventory storage space;

(b) data entry means responsive to a plurality of user identification codes for interactively selecting items of inventory stored in said drawers upon receipt of one of said plurality of codes and data defining each selected inventory item;

(c) drawer coupling means for coupling to each of said plurality of drawers;

(d) inventory transfer means including a support platform for supporting each of said drawers and manipulating each selected drawer between said shelves and said port; and (d) controller means responsive to said data entry means for conveying said drawer coupling means and inventory transfer means to selected ones of said drawers for axially withdrawing selected ones of said plurality of drawers from said shelves onto said support platform and for conveying said support platform and extracted tray to said port to deliver a stored inventory item.

2. A kiosk as set forth in claim 1 wherein said support platform comprises first and second sections that are laterally displaced from one another, wherein said first and second sections each include a plurality of stepped surfaces of successively increasing height such that each stepped surface exhibits a different elevation, wherein said stepped surfaces of said first and second sections are aligned to define a plurality of planar parallel levels at said stepped surfaces, and wherein each of said plurality of said drawers can be supported at one of said plurality of levels.

3. A kiosk as set forth in claim 2 wherein a sidewall of at least one of said plurality of stepped surfaces at each level exhibits a taper that extends inward toward a sidewall of the adjoining stepped surface such that each drawer is directed to a predetermined orientation on said platform as it is withdrawn from said shelves.

4. A kiosk as set forth in claim 2 wherein the bottom containing drawer includes a lip and wherein said drawer coupling means includes a hook member mounted for reciprocating motion in a space between said first and second sections to grip said lip with said hook and direct the bottom containing drawer onto and off of said platform.

5. A kiosk as set forth in claim 2 wherein said drawer coupling means and inventory transfer means are coupled to first and second endless driven linkages that convey said platform along a plurality of horizontal drive tracks and vertical columns.

6. A kiosk as set forth in claim 2 including means for receiving payment to selected inventory items and wherein said data entry means also permits user selections upon receipt of payment.

7. A kiosk as set forth in claim 2 including means for extracting an empty drawer from said shelves and directing said empty drawer and platform to said port to receive a returned inventory item and re-directing the filled drawer to said shelves and re-inserting the filled drawer and returned inventory item onto said shelves.

8. A kiosk as set forth in claim 1 wherein at least one of said plurality of drawers is bottomless.

9. A kiosk as set forth in claim 3 wherein the bottom containing drawer includes a lip and wherein said drawer coupling means includes a hook member mounted for reciprocating motion in a space between said first and second sections to grip said lip with said hook and direct the bottom containing drawer onto and off of said platform.

10. A kiosk as set forth in claim 2 wherein a sidewall of each of said plurality of stepped surfaces at each level exhibits a taper that extends inward toward the sidewall of an adjoining stepped surface such that each drawer is centered on said platform as it is withdrawn from said shelves.

11. A kiosk as set forth in claim 10 wherein the sidewalls of each of said plurality of stepped surfaces are successively displaced at a greater separation at each level such that each level accommodates drawers of a different width.

12. A self-service kiosk comprising:

(a) a portable multi-walled enclosure surrounding a plurality of shelves and including a port communicating with the exterior of said enclosure, wherein said shelves support a plurality of drawers, and wherein at least one of said plurality of drawers includes a lip and a bottom that circumscribes an inventory storage space;

(b) data entry means responsive to a plurality of user identification codes for interactively selecting items of inventory stored in said drawers upon receipt of one of said plurality of codes and data defining each selected inventory item;

(c) drawer coupling means having a hook for coupling said hook to said lip;

(d) inventory transfer means including a support platform for supporting each of said drawers and manipulating each selected drawer between said shelves and said port, wherein said support platform comprises first and second sections that are laterally displaced from one another, wherein said first and second sections each include a plurality of stepped surfaces of successively increasing height, wherein said stepped surfaces of said first and second sections are aligned to define a plurality of planar parallel levels at said stepped surfaces, wherein said drawer coupling means and inventory transfer means are coupled to first and second endless driven linkages that convey said platform along a plurality of horizontal drive tracks and vertical columns; and (e) controller means responsive to said data entry means for conveying said drawer coupling means and inventory transfer means to selected ones of said drawers for axially withdrawing selected ones of said plurality of drawers from said shelves onto a selected one of said plurality of levels at said support platform and for conveying said support platform and extracted tray to said port to deliver a stored inventory item or accept the return of an inventoried item.

13. A kiosk as set forth in claim 12 wherein a sidewall of each of said plurality of stepped surfaces at each level exhibits a taper that extends inward toward the sidewall of an adjoining stepped surface such that each drawer is centered on said platform as it is withdrawn from said shelves.

14. A kiosk as set forth in claim 13 wherein the sidewalls of each of said plurality of stepped surfaces are successively displaced at a greater separation at each level such that each level accommodates drawers of a different width.

* * * * *